United States Patent [19]

Iliopoulos et al.

[11] Patent Number: 6,040,386

[45] Date of Patent: Mar. 21, 2000

[54] (METH)ACRYLIC POLYMERS, METHOD FOR MAKING SAME AND USE THEREOF AS PIGMENT DISPERSANT

[75] Inventors: Ilias Iliopoulos, Paris; Francoise Lafuma, Sceaus; Jean-Philippe Gillet, Gainneville, all of France; Erwoan Pezron, Prairie Village, Kans.

[73] Assignee: Cray Valley S.A, Puteaux, France

[21] Appl. No.: 09/011,742

[22] PCT Filed: Aug. 22, 1996

[86] PCT No.: PCT/FR96/01309

§ 371 Date: Sep. 18, 1998

§ 102(e) Date: Sep. 18, 1998

[87] PCT Pub. No.: WO97/08217

PCT Pub. Date: Mar. 6, 1997

[30] Foreign Application Priority Data

Aug. 24, 1995 [FR] France .................................. 95 10042

[51] Int. Cl.[7] ...................................................... C08F 8/32
[52] U.S. Cl. .................. 525/329.9; 525/329; 526/307.2; 526/307.6
[58] Field of Search ............................. 526/317.1, 307.2, 526/307.6; 525/329.9

[56] References Cited

U.S. PATENT DOCUMENTS

| 4,432,881 | 2/1984 | Evani . |
| 4,524,175 | 6/1985 | Stanley, Jr. . |
| 4,921,903 | 5/1990 | Fong ........................................ 524/555 |
| 5,324,765 | 6/1994 | Mondet et al. ........................... 524/423 |
| 5,367,039 | 11/1994 | Yabuuchi et al. . |
| 5,863,527 | 1/1999 | Hutchins et al. . |
| 5,885,338 | 3/1999 | Nigam et al. . |

FOREIGN PATENT DOCUMENTS

| 2 269 178 | 2/1994 | United Kingdom . |
| WO 91/00302 | 1/1991 | WIPO ................................. 526/317.1 |

OTHER PUBLICATIONS

Kuo, Ping–Lin, et al., *Journal of Applied Polymer Science*, vol. 44, pp. 869–876 (1992).

Zu, Qun, et al., *J. Dispersion Science and Technology*, 13(2), pp. 195–200 (1992).

ANS 14 of 22—AN 1994:458487 DN 121:58487 Meadows et al—Langmuir(1994), 10(7), 2471–9 Inhouse Computer Searched Abstract pp. 45–47.

*Primary Examiner*—Bernard Lipman
*Attorney, Agent, or Firm*—Whyte Hirschboeck Dudek SC

[57] ABSTRACT

(Meth)acrylic copolymers of general formula

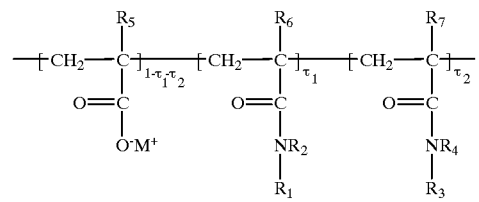

in which:

the $M^+$ are monovalent cations arising from the neutralization of the —COOH groups, it being possible, however, for this neutralization to have been only partial;

$R_1$ and $R_2$ are chosen from: hydrogen, long-chain linear or branched cycloalkyl or alkyl radicals and aryl radicals having from 8 to approximately 22 carbon atoms, with the condition that at least one of $R_1$ and $R_2$ is not hydrogen;

$R_3$ and $R_4$ are independently chosen from: the hydrogen atom, short-chain cycloalkyl or alkyl radicals having from 1 to 7 carbon atoms and aryl radicals having from 6 to 7 carbon atoms;

$R_5$, $R_6$, and $R_7$ are each, independently of one another, chosen from the hydrogen atom and the methyl radical;

$\tau_1$ is the molar level of long-chain amide units in the copolymer; and $\tau_2$ is the molar level of short-chain amide units optionally present in the copolymer.

Their weight-average molar mass does not exceed 30,000 and $\tau_1$ is between 0.01 and 0.30.

15 Claims, No Drawings

(METH)ACRYLIC POLYMERS, METHOD FOR MAKING SAME AND USE THEREOF AS PIGMENT DISPERSANT

Copolymers comprising from 68 to 95 mol % of sodium acrylate and from 32 to 5 mol % of lauryl acrylate are already known, from J. Applied Polymer Science, vol. 44, pp. 869–876 (1992), which are useful for the dispersion of polar and non-polar particles, such as titanium dioxide and carbon black. The dispersion of graphite particles by means of a copolymer, with an average molecular weight of 20,000, of maleic anhydride and of a-olefin having a so-called "comb" structure with simultaneously hydrophilic and hydrophobic side chains is also known from J. Dispersion Science and Technology, 13(2), pp. 195–200 (1992).

Patent E-P-B-107,403 describes a stable aqueous dispersion comprising a water-insoluble copolymer emulsion obtained from 10 to 70 weight % of (meth)acrylic acid, from 0.5 to 25 weight % of N-dodecylacrylamide and, preferably, at least 30 weight % of ($C_1$–$C_4$)alkyl (meth)acrylate. After neutralization by an alkaline hydroxide or volatile amine, this emulsified copolymer becomes highly viscous and capable of thickening various aqueous media, such as water paints, pigmental dispersions, and the like.

U.S. Pat. No. 4,524,175 describes a stable water-in-oil emulsion comprising a non-continuous aqueous phase containing an associative hydrophobic copolymer obtained from 40 to 99.9 mol % of acrylamide, from 0 to 50 mol % of acrylic acid and from 0.1 to 10 mol % of ($C_8$–$C_{12}$)alkyl (meth)acrylate, the said copolymer having a molecular weight of 800,000 to 2,500,000.

U.S. Pat. No. 4,432,881 describes the use, in a water-soluble thickening agent, of a copolymer of (meth)acrylic acid and of a water-insoluble monomer possessing a hydrophobic group containing at least 8 carbon atoms, such as an ethylenically unsaturated N-alkylamide. In this thickening agent, this copolymer is used in combination with a water-dispersible non-ionic surfactant in a ratio by weight of the copolymer to the surfactant of between 0.5 and 20.

Patent FR-A-2,693,202 describes, as thickening agents for aqueous saline solutions, water-soluble amphiphilic copolymers of sodium or potassium acrylate and of N-monoalkylacrylamide (the alkyl group being $C_8$–$C_{16}$), the total number of monomer units being between 500 and 20,000 and the N-monoalkylacrylamide units, present in the proportion of 0.5 to 20 mol %, being distributed non-statistically along the chains, that is to say, on the whole, of the block type.

European Patent Application EP-A-0,494,022 describes a copolymer originating from the copolymerization of a mixture of monomers comprising at least 30% by weight of at least one organic carboxylic acid with ethylenic unsaturation; at least 30% by weight of at least one N-alkylacrylamide, the alkyl group of which contains from 8 to 30 carbon atoms in the alkyl chain; and from 0 to 40% of at least one hydrophilic unsaturated monomer, as well as a corresponding copolymer in which the carboxyl groups are completely or partially salified.

Although the majority of these documents have perceived the advantage of incorporating units derived from fatty N-alkylacrylamides in copolymers capable of influencing the viscosity of aqueous media, none of the copolymers described can be used industrially for the dispersion of pigments, in particular of hydrophobic pigments. This is probably due to inappropriate selection of the main parameters of the copolymers, in particular the choice of very high molecular weights and, in some cases, the presence of a third monomer, such as alkyl (meth)acrylate.

A first aim of the present invention is therefore to define (meth)acrylic copolymers which are easy to produce industrially and which can be used directly as pigment dispersants. A second aim of the present invention is to provide aqueous dispersions of pigments, in particular of hydrophobic pigments, which exhibit (in standard shear gradients, i.e. from 1 to 500 $s^{-1}$) low viscosities, for example from approximately 0.01 to 5 Pa.s, even at low levels of use of the (meth)acrylic copolymer.

It has been found, surprisingly, that these objectives could be achieved with an appropriate selection of the monomers and of their respective proportions in the (meth) acrylic copolymer, as well as of the molecular weight of the copolymer itself.

A first subject of the present invention thus relates to a family of (meth)acrylic copolymers of general formula

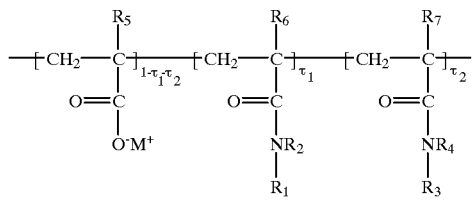

in which:

the $M^+$ are monovalent cations arising from the neutralization of the —COOH groups, it being possible, however, for this neutralization to have been only partial;

$R_1$ and $R_2$ are chosen from: hydrogen, long-chain linear or branched cycloalkyl or alkyl radicals (for example containing 8 to 30 carbon atoms) and aryl radicals having from 8 to approximately 22 carbon atoms, with the condition that at least one of $R_1$ and $R_2$ is not hydrogen;

$R_3$ and $R_4$ are independently chosen from: the hydrogen atom, short-chain cycloalkyl or alkyl radicals having from 1 to 7 carbon atoms and aryl radicals having from 6 to 7 carbon atoms;

$R_5$, $R_6$ and $R_7$ are each, independently of one another, chosen from the hydrogen atom and the methyl radical;

$\tau_1$ is the molar level of long-chain amide units in the copolymer; and $\tau_2$ is the molar level of short-chain amide units optionally present in the copolymer, and characterized in that their weight-average molar mass does not exceed 30,000 and in that $\tau_1$ is between 0.01 and 0.30.

According to the preferential embodiments of the present invention, these copolymers:

have a weight-average molar mass at least equal to 2000, and/or exhibit a molar level $\tau_1$ of between 0.02 and 0.12, and/or exhibit a molar level $\tau_2$ ranging from 0 to 0.4, and/or comprise amide units in which at least one of $R_1$ and $R_2$ is a linear or branched alkyl radical having from 10 to 18 carbon atoms.

The monovalent cation $M^+$ is preferably generally a cation of an alkali metal, such as sodium or potassium, the ammonium ion, a quaternised ammonium ion or alternatively a zinc complex. It can also be, preferably to a minor extent, a proton. Mixtures of monovalent cations as defined above also come within the scope of the present invention.

For the requirements of the present invention, a first method for estimating the weight-average molar mass comprises the esterification of the (meth)acrylic copolymer and then the subjection of the esterified copolymer sample to gel permeation chromatography in tetrahydrofuran, a polystyrene sample being used for calibration. A second method for estimating the weight-average molar mass comprises the use of aqueous-phase steric exclusion chromatography, an aqueous lithium nitrate solution being used as mobile phase, a column based on grafted silica being used and, for example, sodium polyacrylates or polyoxyethylenes being used as standard polymers.

A second subject of the present invention relates to the manufacture of the (meth)acrylic copolymers described above, for which two methods are provided. A first synthetic method comprises the direct copolymerization, by the radical route, of a mixture of monomers comprising: a (meth) acrylic acid, an N-substituted (meth)acrylamide derivative of formula.

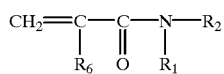

(I)

in which $R_1$, $R_2$ and $R_6$ have the meanings indicated above, and, if appropriate, an N-substituted (meth)acrylamide derivative of formula

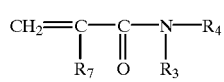

(II)

in which $R_3$, $R_4$ and $R_7$ have the meanings indicated above, the copolymerization being carried out in at least one organic solvent capable of allowing sufficient transfer reaction for the weight-average molar mass of the copolymer not to exceed 30,000 and in the presence of at least one free-radical initiator, at a temperature at most equal to the boiling temperature of the solvent and at least equal to the decomposition temperature of the initiator and for a time, of 0.5 to 12 hours, sufficient to convert all the monomers present ((meth)acrylic acid and N-substituted (meth) acrylamide derivative(s)), the copolymerization being followed by the neutralization of the copolymer formed. The copolymerization temperature is most often between 40° C. and 100° C. The neutralization can be carried out by means of a concentrated base such as ammonia, sodium hydroxide, potassium hydroxide or, preferably, alkali metal alkoxides (sodium or potassium alkoxides), it being possible for the latter to be used in alcoholic solution. According to this first synthetic method, given that the copolymerization time is adjusted to obtain complete conversion, use is made, per derivative 1 mol of mixture of monomers, of $\tau_1$ mol of the N-substituted of formula (I) and, if appropriate, $\tau_2$ mol of the N-substituted derivative of formula (II) per $1-(\tau_1+\tau_2)$ mol of (meth)acrylic acid. The person skilled in the art knows how to choose, by a few routine tests, the copolymerization time appropriate for complete conversion of the monomers depending on the other variable parameters, which are the free-radical initiator, the nature of the $R_1$, $R_2$ and $R_6$, radicals and, if appropriate, the nature of the $R_3$, $R_4$ and $R_7$ radicals and, finally, the values of $\tau_1$ and $\tau_2$. According to this first synthetic method, use is preferably made, as organic solvent, of a light alcohol, such as isopropanol, or alternatively a saturated ester, such as ethyl acetate. Mention may be made, as free-radical initiators, of, inter alia, diazo compounds or organic peroxides, peroxydicarbonates and peroxyesters, such as benzoyl peroxide, tert-butyl hydroperoxide, tert-butyl peroxide, dicumyl peroxide, 2,2-bis(tert-butylperoxy) butane, peracetal, 1,1-bis(t-butylperoxy) -3,3,5-trimethylcyclohexane, tert-butyl perbenzoate, tert-butyl peroxyoctoate, tert-butylperoxy isopropyl carbonate, tert-butyl perisononanoate, tert-butyl permaleate, cyclic peracetal, 2,5-dimethyl-2,5-bis(2-ethylhexylperoxy)hexane, methyl ethyl ketone peroxide, tert-amyl peroxyoctoate, 2,5-diperoxyoctoates, or alternatively 2,4-pentanedione peroxide. The free-radical initiator will preferably be chosen so that its decomposition temperature does not exceed the boiling temperature of the organic solvent at the pressure under consideration. If appropriate, the copolymerization can be carried out in the additional presence of at least one transfer agent in a proportion ranging up to 1% approximately by weight with respect to the monomers.

According to this first synthetic method, the $R_5$, $R_6$ and $R_7$ radicals can be chosen entirely independently of one another and it is possible, for example, to combine, in the copolymer, units derived from a monovalent cation acrylate with units arising from N-substituted methacrylamide derivatives or alternatively, conversely, to combine, in the copolymer, units derived from a monovalent cation methacrylate with units arising from N-substituted acrylamide derivatives.

A second method for the synthesis of the acrylic copolymers described above comprises the reaction of a poly ((meth)acrylic acid), with a weight-average molar mass such that it does not exceed 30,000 after reaction, in a solvent for the said poly((meth)acrylic acid), and a primary or secondary amine of formula $R_1R_2NH$ and, if appropriate, a second primary or secondary amine of formula $R_3R_4NH$, in the presence of a carbodiimide such as dicyclohexylcarbodiimide. This method quantitatively produces, after saponification of the product of this reaction, the acrylic copolymer described above and a diurea, such as dicyclohexylurea. The latter, which is present in the medium in the form of a precipitate, is easily removed from the organic solution by filtration. According to this second method, the reaction is carried out at a temperature not exceeding the boiling point of the chosen solvent, preferably between 20 and 80° C. The reaction is preferably carried out for a time of 30 minutes to 12 hours and the consecutive neutralization is preferably carried out by means of a concentrated base, for example an alcoholic alkali metal alkoxide solution, such as sodium or potassium methoxide or ethoxide, or an aqueous and concentrated solution of an alkali metal hydroxide, such as sodium hydroxide or potassium hydroxide. According to this second synthetic method, $R_5$, $R_6$ and $R_7$ are necessarily identical and are either the hydrogen atom (modification of poly(acrylic acid)) or the methyl radical (modification of poly(methacrylic acid)). Mention may be made, as examples of organic solvents which are suitable for this second synthetic method, of N-methylpyrrolidone and dimethylformamide. As the reaction carried out according to this method is quantitative, use will preferably be made of $\tau_1$ mol of amine $R_1R_2NH$ and, if appropriate, $\tau_2$ mol of amine $R_3R_4NH$ for each mole of poly((meth)acrylic acid) used.

For the manufacture of the (meth)acrylic copolymers according to the invention, the first or the second synthetic method will be chosen depending, on the one hand, on the commercial availability of the N-substituted derivative of formula (I) and, on the other hand, on the possible need to differentiate $R_5$, $R_6$ and $R_7$.

A third subject of the present invention relates to the use of the (meth)acrylic copolymers described above as dispersants for various pigments and more particularly as dispersants for hydrophobic pigments, such as carbon black. Other pigments to which the copolymers according to the invention may usefully be applied as dispersants comprise, on the one hand, inorganic pigments such as titanium dioxide and yellow and red iron oxides and, on the other hand, organic pigments such as copper phthalocyanine blue, β-naphthol reds, azo acetarylide yellows, dioxazine violet and phthalocyanine green. According to the present invention, the (meth)acrylic copolymer is added to a largely aqueous medium containing the said pigment. Largely aqueous medium is understood to mean a dispersion of the hydrophobic or non-hydrophobic, organic or inorganic pigment in water or in a mixture, which is largely water by weight, of water and at least one water-miscible compound, such as a glycol. The concentration of pigment in this dispersion can be highly variable, according to the nature of the pigment, and can reach up to 70 weight % for an inorganic pigment such as titanium dioxide. Usual concentrations for carbon black and copper phthalocyanine blue vary from 10 to 50 weight %. According to the nature of the pigment, the (meth)acrylic copolymer according to the invention is used in a greater or lesser proportion. For example, it is preferable to use from 1 to 10 weight % of copolymer with respect to the weight of pigment when the latter is inorganic, but instead from 1 to 30 weight % of copolymer with respect to the weight of pigment when the latter is organic, these proportions being calculated by weight of dry matter, that is to say by subtracting the weight of the aqueous or largely aqueous medium.

Thus, the (meth)acrylic copolymers according to the invention find a particularly valuable use in all fields involving the use of an aqueous pigmental slurry and in particular in the fields of inks, paints and coatings and of the manufacture of coloured plastics, when the manufacturing process includes an aqueous-phase stage. The use of the (meth)acrylic copolymers according to the invention as dispersants for pigments is more particularly advantageous in the case of aqueous-phase paints and of solvent-phase paints, in particular those using, as polymer binder, a long-oil, medium-oil or short-oil alkyd resin, an alkyd resin modified by a urethane resin, an epoxy resin or an acrylic resin, a vinyl chloride copolymer or a water-dilutable alkyd resin. This use will also be valuable in the case of the manufacture of coated pigments, pigments intended to be dispersed directly in an aqueous formulation. In all these uses, the (meth)acrylic copolymers according to the invention provide substantial advantages with respect to the other dispersant polymers which are already known, in particular in terms of rheological behaviour, of dispers- ing power, of colouring strength, of long-term stability and of compatibility with the pigment and with the other ingredients of the final formulation with which the aqueous pigmental slurry is incorporated, whether this is an ink, paint or coating formulation or alternatively a plastic formulation. In particular, the pigmental dispersions prepared from the copolymers according to the invention have very low viscosities at room temperature, even with a low level of dispersant.

The examples below are provided by way of illustration and without implied limitation of the present invention.

EXAMPLE 1

An aqueous solution supplied by the company Coatex, containing one mol of a sodium polyacrylate with a weight-average molar mass equal to 4,000, is then passed through an ion-exchange column, the resin of which has been acidified beforehand with hydrochloric acid and rinsed to remove any trace of salt. The fractions recovered are concentrated and then lyophilized. The poly(acrylic acid) thus obtained is dissolved in 500 ml of N-methylpyrrolidone. A solution of 0.05 mol of fatty amine (dodecylamine) is added dropwise at a temperature of 60° C. The temperature is then brought to 80° C. A solution of 0.055 mol of dicyclohexylcarbodiimide in 80 ml of N-methylpyrrolidone is run in dropwise with vigorous stirring. The mixture is then stirred for 1 hour at 80° C. and then left stirring until the temperature reaches 20° C. The solution is then filtered in order to remove the dicyclohexylurea precipitate. 2 equivalents (calculated with respect to the carboxyl groups) of sodium methoxide, as a 33% solution in methanol, are then added while cold and with vigorous stirring and the precipitated acrylic copolymer according to the invention is recovered, dried, redissolved in water, precipitated from methanol, dried, redissolved in water and lyophilized. The yield from this synthesis is equal to 65%.

Spectroscopic analysis by proton nuclear magnetic resonance of the acrylic copolymer thus obtained makes it possible to confirm the general formula:

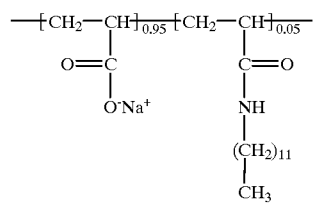

The weight-average molar mass of this copolymer is equal to 4300.

EXAMPLE 2

A dispersion comprising, by weight, 67% of water, 30% of carbon black and 3% of the acrylic copolymer of Example 1 is prepared. The rheology of this dispersion is studied using a Carrimed type C.S. rheometer. In particular, the viscosity η, expressed in Pa.s, of the dispersion is measured at different shear gradients y (expressed in $s^{-1}$). The results of these measurements appear in Table I below.

EXAMPLE 3 (COMPARATIVE)

A carbon black dispersion is prepared as in Example 2 but using a product sold under the name Joncryl 678 as dispersant. The results of the viscosity measurements with respect to this dispersion are shown in Table I below.

EXAMPLE 4

The synthesis of Example 1 is repeated, apart from the two following exceptions:
- the starting sodium polyacrylate supplied by the company Fluka has a weight-average molar mass equal to 5100.
- stearylamine is used as fatty amine instead of dodecylamine.

A copolymer with a weight-average molar mass equal to 5700 is obtained with a yield of 65%.

EXAMPLE 5

A carbon black dispersion is prepared as in Example 2 but using the copolymer of Example 4 as dispersant. The results of the viscosity measurements with respect to this dispersion are shown in Table I below.

EXAMPLE 6

A dispersion comprising, by weight, 58% of water, 40% of carbon black and 2% of the acrylic copolymer of Example 4 is prepared. The results of the viscosity measurements with respect to this dispersion are shown in Table I below.

EXAMPLE 7

The synthesis of Example 1 is repeated, apart from the two following exceptions:
- the starting sodium polyacrylate has a weight-average molar mass equal to 5100.
- the amount of dodecylamine involved is doubled and brought to 0.10 mol.

A copolymer comprising 90% of units derived from sodium acrylate and 10% of units derived from the fatty acrylamide, the weight-average molar mass of which is equal to 5900, is obtained with a yield of 65%.

EXAMPLE 8

A dispersion comprising, by weight, 59% of water, 40% of phthalocyanine blue sold under the name Langdocyal PO 361 by the company Languedocienne De Microncouleurs and 1% of the acrylic copolymer of Example 7 is prepared. The results of the viscosity measurements with respect to this dispersion are shown in Table II below.

EXAMPLE 9 (COMPARATIVE)

A dispersion comprising, by weight, 55.8% of water, 40% of phthalocyanine blue (reference PO 361) and 4.2% of a dispersant sold by the company Akzo under the reference Dapral GE 202 is prepared. The results of the viscosity measurements with respect to this dispersion are shown in Table II below. It is important to note that when, for equal proportions (40%) of pigment, the proportion of dispersant is lowered to 1% while correspondingly increasing the proportion of water to 59%, the viscosity of the dispersion is then increased to a point such that it is no longer measurable.

EXAMPLE 10

A dispersion comprising, by weight, 29.37% of water, 70% of titanium dioxide sold under the name TR 80 by the company Tioxide and 0.63% of the acrylic copolymer of Example 7 is prepared. The results of the viscosity measurements with respect to this dispersion are shown in Table II below.

EXAMPLE 11 (COMPARATIVE)

A dispersion comprising, by weight, 28.9% of water, 70% of titanium dioxide (reference TR 80) and 1.1% of the dispersant Dapral GE 202, already mentioned, is prepared. The results of the viscosity measurements with respect to this dispersion are shown in Table II below. It is important to note that when, for equal proportions (70%) of pigment, the proportion of dispersant is lowered to 0.63% while correspondingly increasing the proportion of water to 29.37%, the viscosity of the dispersion is then increased to a point such that it is no longer measurable.

TABLE I

CARBON BLACK DISPERSIONS

| EXAMPLE | Dispersant Structure | Pigment (%) | Dispersant (%) | $\eta\ (\gamma = 1\ s^{-1})$ (in Pa · s) | $\eta\ (\gamma = 100\ s^{-1})$ (in Pa · s) |
|---|---|---|---|---|---|
| 3 (ref.) | Joncryl 678 AA/St./α-MS Copo. | 30 | 3 | 2.5 | 0.3 |
| 2 | AA/dodecylacrylamide Copo. 95/5; Mw = 4300 | 30 | 3 | 1.3 | 0.15 |
| 5 5 | AA/N-stearylacrylamide Copo. 95/5; Mw = 5100 | 30 | 3 | 0.042 | 0.007 |
| 6 | AA/N-stearylacrylamide Copo. 95/5; Mw = 5100 | 40 | 2 | 3.5 | 2.5 |
| 13 | AA/didodecylacrylamide Copo. 95/5; Mw = 5900 | 30 | 1.5 | 0.52 | 0.06 |
| 15 | AA/isopropylacrylamide/ dodecylacrylamide Terpo. (70/20/10) | 30 | 0.5 | 0.15 | 0.03 |
| 17 | AA/N-dodecylacrylamide Copo. 90.5/9.5; Mw = 10,000 | 30 | 0.3 | 0.043 | 0.007 |

TABLE II

PHTHALOCYANINE BLUE AND $TiO_2$ DISPERSIONS

| EXAMPLE | Dispersant Structure | Pigment (in %) | Dispersant (in %) | $\eta\ (\gamma = 50\ s^{-1})$ (in Pa · s) | $\eta\ (\gamma = 500\ s^{-1})$ (in Pa · s) |
|---|---|---|---|---|---|
| 9 (ref.) | Dapral GE 202 Polycarboxylic acid with a "comb" structure; Mw = 20,000 | phthalocyanine blue (40) | 4.2 | 0.033 | 0.031 |
| 8 | AA/N-dodecylacrylamide Copo. (90/10); Mw = 5900 | phthalocyanine blue (40) | 1 | 0.029 | 0.026 |

TABLE II-continued

PHTHALOCYANINE BLUE AND TiO$_2$ DISPERSIONS

| EXAMPLE | Dispersant Structure | Pigment (in %) | Dispersant (in %) | $\eta$ ($\gamma = 50$ s$^{-1}$) (in Pa · s) | $\eta$ ($\gamma = 500$ s$^{-1}$) (in Pa · s) |
|---|---|---|---|---|---|
| 11 (ref.) | Dapral GE 202 Polycarboxylic acid with a "comb" structure; Mw = 20,000 | TiO$_2$ (70) | 1.1 | 0.035 | 0.023 |
| 10 | AA/N-dodecylacrylamide Copo. (90/10); Mw = 5900 | TiO$_2$ (70) | 0.63 | 0.035 | 0.020 |

EXAMPLE 12

The synthesis of Example 1 is repeated, apart from the two following exceptions:

the starting sodium polyacrylate supplied by the company Fluka has a weight-average molar mass equal to 5100.

didodecylamine is used as fatty amine instead of dodecylamine.

A copolymer with a weight-average molar mass equal to 5900 is then obtained with a yield of 70%.

EXAMPLE 13

A dispersion comprising, by weight, 68.5% of water, 30% of carbon black and 1.5% of the acrylic copolymer of Example 12 is prepared. The results of the viscosity measurements with respect to this dispersion are shown in Table I.

EXAMPLE 14

The synthesis of Example 7 is repeated up to the filtration of the reaction mixture in order to remove the dicyclohexylurea precipitate. A solution of 0.20 mol of isopropylamine in 200 ml of N-methylpyrrolidone is then added dropwise at a temperature of 0° C. A solution of 0.22 mol of dicyclohexylcarbodiimide in 150 ml of N-methylpyrrolidone is then run in and the mixture is then stirred for 1 hour at a temperature of 0° C. The dicyclohexylurea precipitate is then removed and the polymer formed is then neutralized and purified as in Example 1. The yield from this synthesis is equal to 30%.

Spectroscopic analysis by proton nuclear magnetic resonance confirms the formation of a terpolymer of formula:

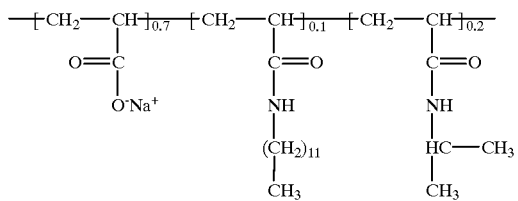

EXAMPLE 15

A dispersion comprising, by weight, 69.5% of water, 30% of carbon black and 0.5% of the acrylic terpolymer of Example 14 is prepared. The results of the viscosity measurements with respect to this dispersion are shown in Table I.

EXAMPLE 16

10 g of acrylic acid and then 84 ml of a solution of 3.5 g of N-dodecylmethacrylamide in. isopropanol are introduced into a stirred reactor equipped with a stirrer and a condenser. A solution of 0.75 g of benzoyl peroxide in 28 ml of ethyl acetate is also added to the reactor. The reactor is then heated to 83° C. and is maintained at reflux for 3 hours. After cooling, the copolymer formed is neutralized with 54 ml of a 30% solution of sodium methoxide in methanol. The precipitate formed is filtered off, rinsed with isopropanol, dried under vacuum, dissolved in water and then lyophilized. The yield from this synthesis is 66%. Spectroscopic analysis by proton nuclear magnetic resonance confirms the formation of a copolymer comprising 90.5 mol % of units derived from sodium acrylate and 9.5 mol % of units derived from N-dodecylmethacrylamide. The weight-average molar mass of this copolymer (estimated by aqueous-phase stearic exclusion chromatography using a 0.5 molar lithium nitrate solution as mobile phase and using Shodex OH-PAK columns and poly(ethylene oxide) as standard polymers) is 5500.

EXAMPLE 17

A dispersion comprising, by weight, 69.75% of water, 30% of carbon black and 0.25% of the copolymer of Example 16 is prepared. The results of the viscosity measurements for this dispersion are shown in Table I.

We claim:

1. A (meth)acrylic copolymer having monomer units represented by the formula

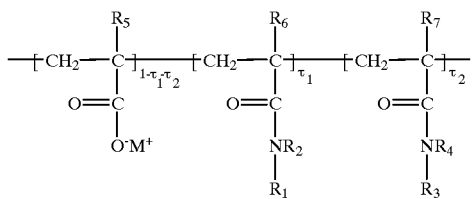

wherein the $M^+$ are monovalent cations arising from the neutralization of the —COOH groups, it being possible, however, for this neutralization to have been only partial;

$R_1$ and $R_2$ are selected from the group consisting of: hydrogen, long-chain linear or branched cycloalkyl or alkyl radicals, containing from 8 to 30 carbon atoms, and aryl radicals having from 8 to 22 carbon atoms, with the condition that at least one of $R_1$ and $R_2$ is not hydrogen;

$R_3$ and $R_4$ are independently selected from the group consisting of: a hydrogen atom, short-chain cycloalkyl and alkyl radicals having from 1 to 7 carbon atoms and aryl radicals having from 6 to 7 carbon atoms;

$R_5$, $R_6$ and $R_7$ are each, independently of one another, selected from the group consisting of a hydrogen atom and a methyl radical;

$\tau_1$ represents the molar ratio of long-chain amide units with respect to all monomeric units of copolymer; and $\tau_2$ represents the molar ratio of optional short-chain amide units with respect to all monomeric units of the copolymer molecule, and the weight-average molecular weight of the copolymer does not exceed 30,000 and $\tau_1$, is between 0.01 and 0.30.

2. The (meth)acrylic copolymer according to claim 1 having a weight-average molecular weight of at least 2000.

3. The (meth)acrylic copolymer according to claim 1 having a $\tau_1$ of between 0.02 and 0.12.

4. The (meth)acrylic copolymer according to claim 1 having a $\tau_2$ in the range from 0 to 0.4.

5. The (meth)acrylic copolymer according to claim 3 having a $\tau_2$ in the range from 0 to 0.4.

6. The (meth)acrylic copolymer according to claim 1 comprising amide units in which at least one of $R_1$ and $R_2$ is a linear or branched alkyl radical having from 10 to 18 carbon atoms.

7. The (meth)acrylic copolymer according to claim 5 comprising amide units in which at least one of $R_1$ and $R_2$ is a linear or branched alkyl radical having from 10 to 18 carbon atoms.

8. The (meth)acrylic copolymer according to claim 1 wherein the monovalent cation $M^{3\oplus}$ is selected from the group consisting of alkali metal cations, ammonium ion, quaternized ammonium ions and zinc complexes.

9. A process for the manufacture of (meth)acrylic copolymers according to claim 1 by direct copolymerization, via the radical route, of a mixture of monomers comprising (meth)acrylic acid and an N-substituted (meth)acrylamide derivative of formula

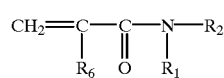

(I)

in which $R_1$, $R_2$ and $R_6$ are the same as defined in claim 1, the copolymerization being carried out in an organic solvent and in the presence of at least one free-radical initiator, at a temperature between the decomposition temperature of the initiator and the boiling temperature of the solvent, for a time period in the range from 0.5 to 12 hours, followed by neutralization of the resulting copolymer.

10. The process according to claim 9 wherein the mixture of monomers further comprises an N-substituted (meth)acrylamide derivative of formula

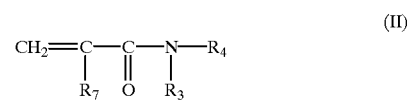

(II)

in which $R_3$, $R_4$ and $R_7$ are the same as defined in claim 1.

11. The process according to claim 9, wherein the N-substituted derivative of formula (I) is present in the mixture of monomers in an amount between 0.02 and 0.12 mole, per 1 mole of the mixture of monomers.

12. The process according to claim 11, wherein the N-substituted derivative of formula (II) is present in the mixture of monomers in an amount ranging from 0 to 0.4 mole per 1 mole of the mixture of monomers.

13. An aqueous composition comprising (meth)acrylic copolymer according to claim 1 and a pigment dispersed in the aqueous composition.

14. The composition according to claim 13 wherein the pigment is inorganic and the (meth)acrylic copolymer is present in an amount of 1 to 10 weight-percent relative to the weight of the pigment in the composition.

15. The composition according to claim 13, wherein the pigment is organic and the (meth)acrylic copolymer is present in an amount of 1 to 30 weight-percent relative to the weight of the pigment.

* * * * *

UNITED STATES PATENT AND TRADEMARK OFFICE
CERTIFICATE OF CORRECTION

PATENT NO. : 6,040,386
DATED : March 21, 2000
INVENTOR(S) : Ilias Iliopoulos

It is certified that error appears in the above-identified patent and that said Letters Patent is hereby corrected as shown below:

Title page, second column [57] ABSTRACT: Add the following line after the last line: --Application to pigment dispersion.--.

Column 5, line 52: Replace "dispers- ing" with --dispersing--.

Column 6, line 44: Replace "y" with --γ--.

Column 11, line 26: Replace "M³⁰" with --M⁺--.

Signed and Sealed this

Sixth Day of February, 2001

Q. TODD DICKINSON

*Attest:*

*Attesting Officer*

*Director of Patents and Trademarks*